United States Patent [19]
Lang et al.

[11] Patent Number: 5,503,426
[45] Date of Patent: Apr. 2, 1996

[54] METHOD OF ATTACHING A MOUNTING BRACKET TO AN AIRBAG INFLATOR

[75] Inventors: Gregory J. Lang, Ogden; Todd S. Parker, Centerville; Brian H. Fulmer, Farr West, all of Utah

[73] Assignee: Morton International, Inc., Chicago, Ill.

[21] Appl. No.: 522,836

[22] Filed: Sep. 1, 1995

[51] Int. Cl.$^6$ .................................................. B60R 21/16
[52] U.S. Cl. ........................ 280/728.2; 280/731; 280/741
[58] Field of Search ................................. 280/728.2, 731, 280/741, 732, 743, 736, 728.1

[56] References Cited

U.S. PATENT DOCUMENTS

| | | | |
|---|---|---|---|
| 4,752,083 | 6/1988 | Honda | 280/731 |
| 5,141,247 | 8/1992 | Barth | 280/728.2 |
| 5,275,431 | 1/1994 | Stephens | 280/728 A |
| 5,308,588 | 5/1994 | Emery et al. | 280/731 X |
| 5,470,101 | 11/1995 | Ennis | 280/728.2 |

FOREIGN PATENT DOCUMENTS

| | | | |
|---|---|---|---|
| 0160756 | 6/1989 | Japan | 280/728.2 |

Primary Examiner—Christopher P. Ellis
Attorney, Agent, or Firm—George W. Rauchfuss, Jr.; Gerald K. White

[57] ABSTRACT

A method of attaching a mounting bracket to an inflator having a cylindrical sidewall and a peripheral inflator flange radially extending from the sidewall that includes: providing a unitary mounting bracket having a annular support, a flange seat adjacent the annular support for receiving the peripheral inflator flange and a cylindrical sleeve extending from the flange seat and having a distal portion; sliding the cylindrical sleeve of the mounting bracket onto the inflator until the inflator flange butts against the flange seat; and applying a suitable amount of axial force to the distal portion of the sleeve so that the distal portion deforms radially inwardly into a clamping band underlying at least a portion of the inflator flange. The inflator flange is clamped between the clamping band and the flange seat to secure the mounting bracket to the inflator. Preferably, a crimping die is used to crimp the distal portion of the sleeve into a clamping band while the inflator is supported in an inflator nest.

16 Claims, 3 Drawing Sheets

1

METHOD OF ATTACHING A MOUNTING BRACKET TO AN AIRBAG INFLATOR

FIELD OF THE INVENTION

The present invention relates to a method of attaching a mounting bracket to an airbag inflator for use with an airbag module assembly. More particularly, the present invention relates to an axial crimping or forming method for attaching a mounting bracket to an airbag inflator for use in a driver side airbag module assembly.

BACKGROUND OF THE INVENTION

Providing a reliable and low cost method of attaching a mounting bracket to a driver side airbag inflator that allows greater flexibility in the design of the mounting bracket and inflator would be useful.

Inflators are used in airbag module assemblies that are in turn used in inflatable restraint systems. Inflatable restraint systems are employed in automobiles for protecting an occupant against injury by physically restraining the occupant's body when the automobile encounters a collision.

The airbag module assembly normally includes an inflator, a module base plate and an airbag cushion. The inflator includes an inflator housing containing a gas generant material that, once triggered by a remote collision sensor, provides the inflation gas for inflating the airbag cushion. A commonly used inflator housing has a cylindrical sidewall forming a plurality of gas exhaust ports, and an integral annular support that extends radially outwardly from the sidewall below the gas exhaust ports. The module base plate has an inflator-receiving hole with a portion of the sidewall containing the gas exhaust ports extending therethrough with the annular support positioned against the base plate. The airbag cushion has an open mouth formed by a collar that fits over the inflator with the collar positioned against the base plate so that the gas exhaust ports are located within the open mouth. The collar of the airbag cushion and the annular support of the inflator are secured to the module base plate, holding the assembly together, and preventing the airbag cushion and inflator from becoming separated during inflation of the airbag cushion.

Providing a annular support that is separate from, yet easily attachable to the inflator would save manufacturing time and reduce costs. Because the annular support is integral with the inflator housing on most existing inflators, the inflator housing is much more difficult and costly to fabricate. Using a stamping technique to manufacture the inflator, which is preferable from a cost standpoint, does not readily allow incorporating the annular support as an integral part of the inflator. Accordingly, providing an inflator housing that does not have an integral peripheral mounting bracket but has a separate, attachable mounting bracket that can be easily attached to the inflator prior to installing the inflator within the airbag module assembly would be useful.

One prior art inflator, shown and described in U.S. Pat. No. 5,275,431, provides an inflator and a separate retainer member or mounting bracket that is secured to the inflator using a radial crimping or forming method. The '431 inflator has an inflator flange and the mounting bracket has an annular wall surface or cylindrical sleeve encircling the inflator and the inflator flange. A first flange or annular support, that attaches to the airbag module, extends outwardly from the sleeve and a second flange or clamping band extends inwardly over the inflator flange. Once slid onto the inflator flange and the inflator, a crimped portion or flange seat is formed in the sleeve using a radial crimping or forming method. The flange seat clamps the inflator flange against the clamping band securing the mounting bracket to the inflator.

The radial crimping or forming method used to assemble the '431 inflator has many drawbacks. First, radial crimping is an awkward and time consuming assembly method. In addition, radial crimping requires a mounting bracket design that provides a minimum distance between the annular support and the clamping band to allow room for the radial crimping tool. This requirement limits the design options of the mounting bracket and inflator which is significant since a continuing design goal is to minimize this distance to meet size limitations placed on an airbag module adapted to be mounted in a steering wheel.

It would be useful, therefore, to provide a simple, reliable and low cost method of attaching a mounting bracket to a driver side airbag inflator that allows flexibility in the design of the mounting bracket and inflator. The mounting bracket should lock onto the inflator, mount the inflator within an airbag module assembly, and prevent inflator rotation with respect to the bracket. The bracket should secure the inflator to the airbag module assembly, withstand the expansive forces during inflation of the airbag, and provide shake and rattle-free mounting.

SUMMARY OF THE INVENTION

An object, therefore, of the present invention is to provide a reliable and low cost method of attaching a mounting bracket to a driver side airbag inflator.

Another object of the present invention is to provide a reliable and low cost method of attaching a mounting bracket to a driver side airbag inflator that allows flexibility in the design of the mounting bracket and inflator.

In carrying out this invention, there is provided a method of attaching a mounting bracket to an inflator having a sidewall and a peripheral inflator flange radially extending from the sidewall.

The method comprises providing a unitary mounting bracket having an annular support, a flange seat adjacent the annular support for receiving the peripheral inflator flange and a sleeve extending from the flange seat and having a distal portion. The sleeve of the mounting bracket is slid over the sidewall of the inflator until the flange seat butts against the inflator flange. Then the distal portion of the sleeve is deformed radially inwardly so that the distal portion forms a clamping band underlying at least a portion of the inflator flange, thereby clamping the inflator flange between the clamping band and the flange seat to secure the mounting bracket to the inflator.

According to one aspect of the present invention, the distal portion of the sleeve is deformed sufficiently to clamp the inflator flange between the flange seat and the clamping band and thereby prevent inflator rotation with respect to the mounting bracket in addition to securing the mounting bracket to the inflator.

According to another aspect of the present invention, a crimping die having a generally concave depression sized to receive the distal portion of the sleeve is provided. The concave depression of the crimping die is placed over the distal portion of the sleeve and a suitable amount of axial force is applied to the crimping die so that the crimping die deforms the distal portion of the sleeve radially inwardly into the clamping band.

According to an additional aspect of the present invention, an inflator nest having a face surrounding a recess sized to receive a portion the sidewall of the inflator is provided. The inflator is placed within the recess so that the annular support of the mounting bracket abuts the face prior to deforming the distal portion of the sleeve.

Because the distal portion of the mounting bracket sleeve is crimped or deformed, the sleeve between the annular support and the clamping band does not have to be adapted to accommodate a radial crimping tool. In other words, the distance between the support and the clamping band does not have to be large enough to accommodate a radial crimping tool. The present invention therefore provides a simple, reliable and low cost method of attaching a mounting bracket to a driver side airbag inflator that allows flexibility in the design of the mounting bracket and inflator.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
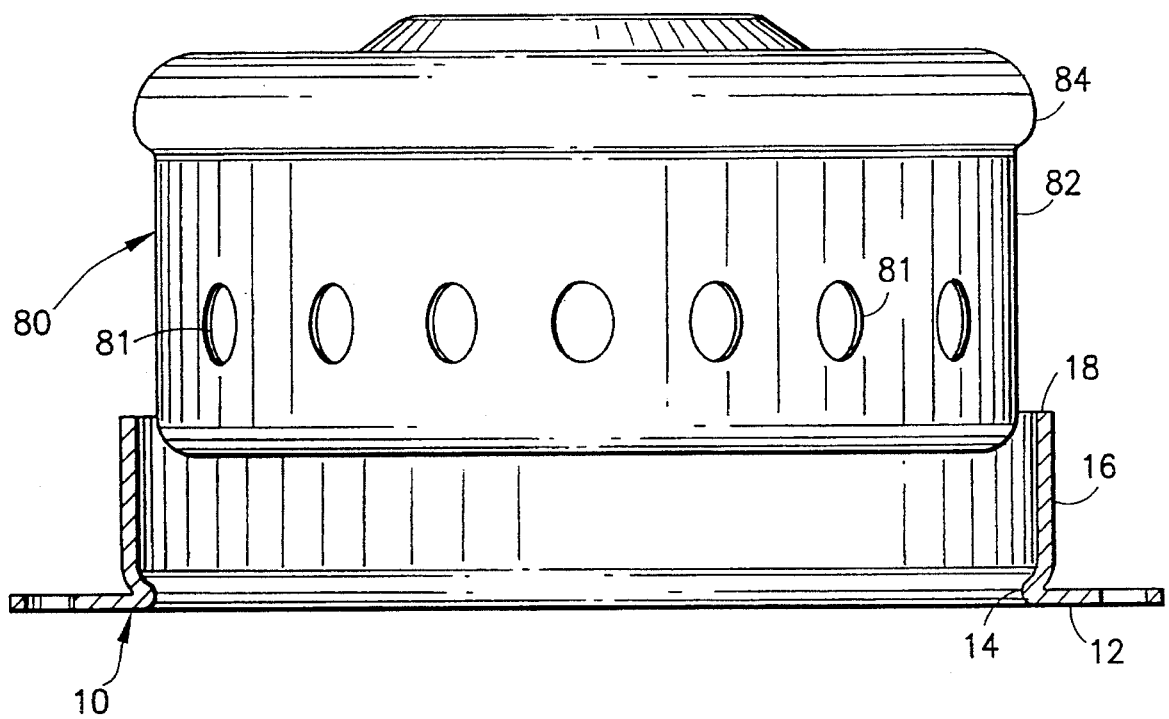
FIG. 1 is a side elevation view, partially in section, of a pre-formed mounting bracket positioned for receiving an inflator, illustrating a first step of a method of attachment according to the present invention.

Referring to FIGS. 1–4, the present invention is directed to a method of attaching a mounting bracket 10 to an inflator, generally represented by the reference numeral 80, having a cylindrical sidewall 82 and a peripheral inflator flange 84 radially extending from the sidewall 82.

The method first comprises providing a unitary mounting bracket, generally represented by the reference numeral 10, having a continuous annular support 12, a continuous flange seat 14 adjacent the annular support 12 for receiving the peripheral inflator flange 84, and a cylindrical sleeve 16 extending from the flange seat 14 and having a distal portion 18.

Figure 2:
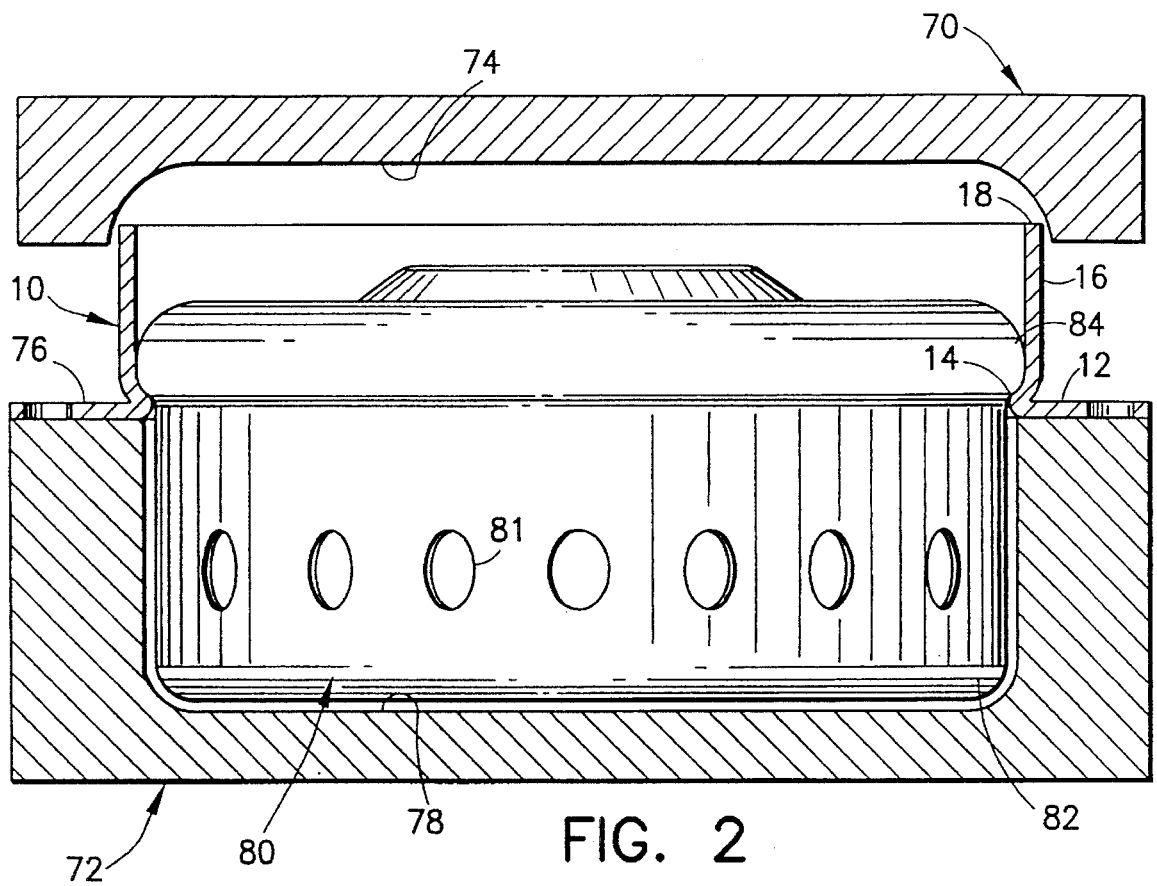
FIG. 2 is a side elevation view, partially in section, of the pre-formed mounting bracket seated on the inflator, illustrating a second step of the method of attachment according to the present invention, and showing the mounting bracket and inflator positioned between an inflator nest and a crimping die.
Figure 3:
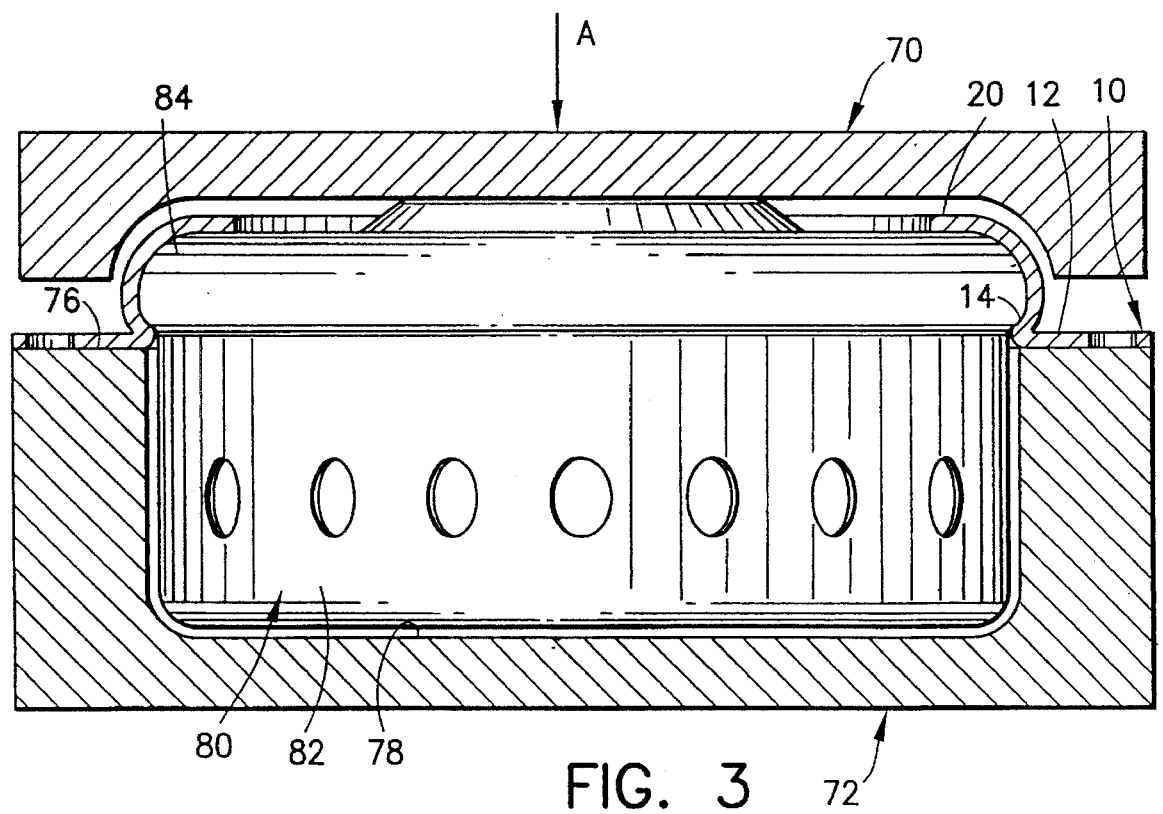
FIG. 3 is a side elevation view, partially in section, of the mounting bracket and inflator after axial crimping of the mounting bracket, illustrating a third step of the method of attachment according to the present invention, and showing the mounting bracket and inflator positioned between an inflator nest and a crimping die.
Figure 4:
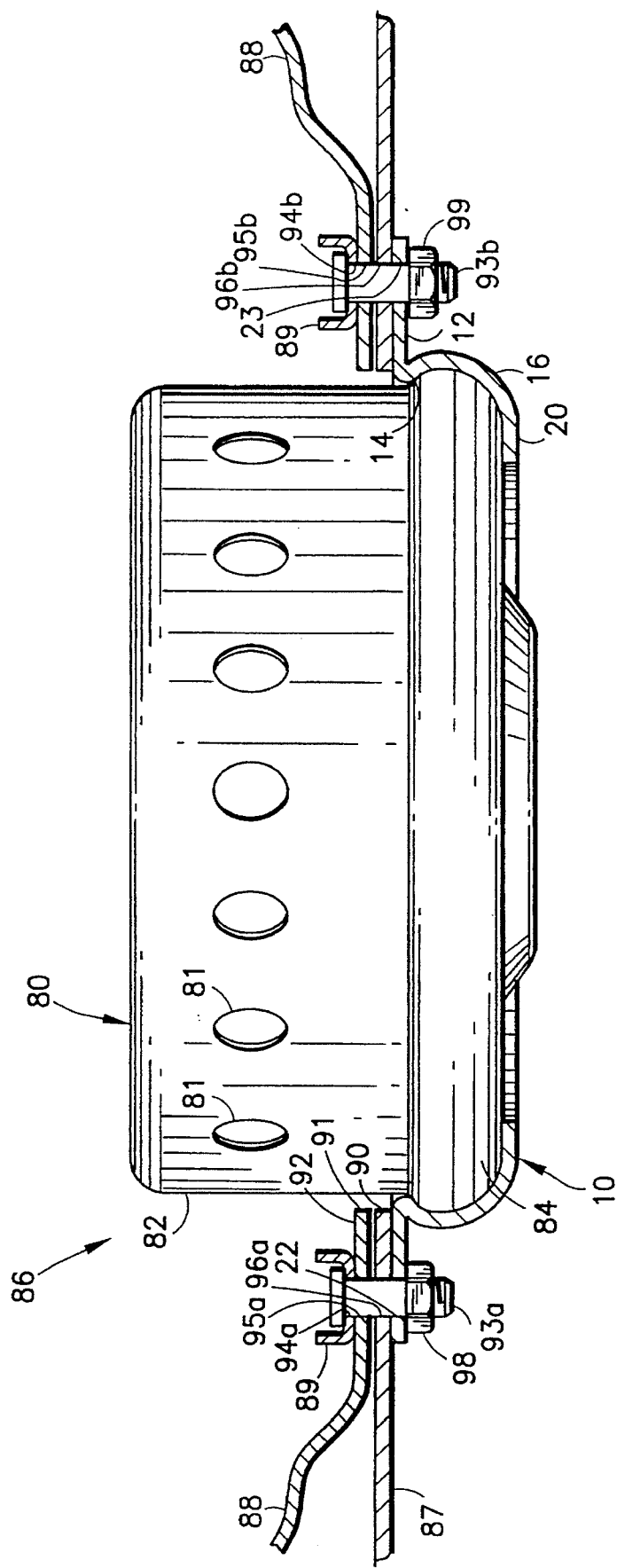
FIG. 4 is a side elevation view, partially in section, of the mounting bracket and inflator after axially crimping of the mounting bracket showing the mounting bracket and inflator secured in an airbag module assembly.

As shown in FIG. 1, the first step of the method of attachment is to place the mounting bracket 10 in a position for receiving the inflator 80. From this position the cylindrical sleeve 16 of the mounting bracket 10 is then slid onto the inflator 80 until the inflator flange 84 butts against the flange seat 14 as shown in FIG. 2, which illustrates the second step. The third step of the method is deforming the distal portion 18 of the sleeve 16 radially inwardly to form a continuous clamping band 20 underlying at least a portion of the inflator flange 84 as shown in FIG. 3. The clamping band 20 clamps the inflator flange 84 against the flange seat 14 to prevent the inflator 10 from rotating with respect to the mounting bracket 10 and to secure the mounting bracket 10 to the inflator 80. It should be noted that in FIGS. 1 through 3, the mounting bracket 10 and inflator 80 are inverted from their usual orientation in an assembled airbag module 86, as shown in FIG. 4. References to orientation may be interpreted accordingly.

As shown in FIGS. 2 and 3, a crimping die 70 and an inflator nest 72 are preferably used to crimp or deform the distal portion 18 of the sleeve 16, although other tools or another method could be used to deform the distal portion 18. In addition, the force applied does not necessarily have to be axial in nature. The crimping die 70 has a generally circular, or partial hemispheric, concave depression 74 sized to receive the distal portion 18 of the cylindrical sleeve 16 of the mounting bracket 10, and the inflator nest 72 has a generally flat face 76 with a generally cylindrical recess 78 sized to receive the inflator sidewall 82. The inflator 80, with the mounting bracket 10 positioned thereon, is placed in the inflator nest 72 with the annular support 12 of the mounting bracket 10 abutting the flat face 76 of the inflator nest 72. The concave depression 74 of the crimping die 70 is then placed over the distal portion 18 of the sleeve 16 and, as shown in FIG. 3, a suitable amount of axial force, schematically illustrated by arrow A, is applied to the die 70 so that the die 70 crimps the distal portion 18 inwardly to form the clamping band 20. Although other tools could be used to apply the axial force A, the crimping die 70 applies the axial force A in a substantially even manner and reduces the chances of damaging the inflator 80.

FIG. 4 shows the mounting bracket 10 and inflator 80, after axial crimping, secured in a driver side airbag module 86. The airbag module 86 includes a module base plate 87, an airbag cushion 88 and an airbag retainer 89. The cylindrical sidewall 82 of the inflator 80 includes a plurality of gas exhaust ports 81 and contains a gas generant material that, once triggered by a remote collision sensor (not shown), provides the inflation gas for inflating the airbag cushion 88. The annular support 12 of the mounting bracket 10 is positioned against the module base plate 87 so that a portion of the sidewall 82 containing the gas exhaust ports 81 extends through an inflator receiving hole 90 in the base plate 87. The airbag cushion 88 has an open mouth 91 formed by a collar 92 that fits over the inflator 80 with the collar 92 positioned against the base plate 87 so that the gas exhaust ports 81 are located within the open mouth 91. The airbag retainer 89 is positioned over the collar 92 of the airbag cushion 88 and the retainer 89, collar 92 and annular support 12 are secured to the module base plate 87 with fasteners 93a,93b. The fasteners 93a,93b pass through, respectively, receiving holes 94a,94b in the retainer 89, receiving holes 95a,95b in the collar 92, receiving holes 96a,96b in the base plate 87 and receiving holes 22,23 in the annular support 12, and are secured with nuts 98,99 or the like. During inflation of the airbag cushion 88, inflation forces tend to push the inflator 80 downward and the clamping band 20 holds the inflator 80 within the airbag module 86.

The present invention, therefore, provides a simple, reliable and low cost method of attaching a mounting bracket 10 to a driver side airbag inflator 80 that allows flexibility in the design of the mounting bracket 10 and inflator 80. The mounting bracket 10 secures to the inflator 80, mounts the inflator within an airbag module assembly 86, and prevents inflator rotation with respect to the mounting bracket 10. The mounting bracket 10 secures the inflator 80 to the airbag module assembly 86, withstands the expansive forces during inflation of the airbag, and provides shake and rattle-free mounting.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A method of attaching a mounting bracket to an inflator having a sidewall and a peripheral inflator flange radially extending from the sidewall, the method comprising:

providing a unitary mounting bracket having an annular support, a flange seat adjacent the annular support for receiving the peripheral inflator flange, and a sleeve sized and shaped to receive the inflator flange, the sleeve extending from the flange seat and having a distal portion;

sliding the sleeve of the mounting bracket over the sidewall of the inflator until the flange seat butts against the inflator flange; and deforming the distal portion of the sleeve radially inwardly to form a clamping band underlying at least a portion of the inflator flange, thereby clamping the inflator flange between the clamping band and the flange seat to secure the mounting bracket to the inflator.

2. The method of claim 1 further including providing a crimping die having a generally concave depression sized to receive the distal portion of the mounting bracket sleeve, placing the concave depression of the crimping die over the distal portion of the mounting bracket sleeve after sliding the mounting bracket sleeve onto the inflator, and applying a suitable amount of axial force to the crimping die so that the crimping die deforms the distal portion of the mounting bracket sleeve radially inwardly into the clamping band.

3. The method of claim 1 further including providing an inflator nest having a face surrounding a recess sized to receive a portion of the inflator, and placing said portion of the inflator within the recess so that the annular support of the mounting bracket abuts the face prior to deforming the distal portion of the sleeve.

4. The method of claim 1 wherein the distal portion of the sleeve is deformed sufficiently to clamp the inflator flange between the flange seat and the clamping band to prevent inflator rotation with respect to the mounting bracket in addition to securing the mounting bracket to the inflator.

5. The method of claim 1 wherein the clamping band is continuous.

6. The method of claim 1 wherein the annular support is continuous.

7. The method of claim 1 wherein the flange seat is continuous.

8. The method of claim 1 wherein the sidewall of the inflator is cylindrical.

9. The method of claim 1 wherein the distal portion of the sleeve is deformed by applying a suitable amount of axial force to the distal portion.

10. A method of attaching a mounting bracket to an inflator having a cylindrical sidewall and a peripheral inflator flange radially extending from the sidewall, the method comprising:

providing a unitary mounting bracket having a continuous annular support, a continuous flange seat adjacent the annular support for receiving the peripheral inflator flange, and a cylindrical sleeve extending from the flange seat and having a distal portion;

sliding the cylindrical sleeve of the mounting bracket over the sidewall of the inflator until the flange seat butts against the inflator flange; and applying a suitable amount of force to the distal portion of the sleeve to deform the distal portion radially inwardly into a continuous clamping band underlying at least a portion of the inflator flange to clamp the inflator flange between the clamping band and the flange seat, thereby securing the mounting bracket to the inflator and preventing the inflator from rotating with respect to the mounting bracket.

11. A method of attaching a mounting bracket to an inflator having a cylindrical sidewall and a peripheral inflator flange radially extending from the sidewall, the method comprising:

providing a unitary mounting bracket having an annular support, a flange seat adjacent the annular support for receiving the peripheral inflator flange, and a cylindrical sleeve extending from the flange seat and having a distal portion;

providing a crimping die having a generally concave depression sized to receive the distal portion of the cylindrical sleeve;

sliding the cylindrical sleeve of the mounting bracket over the sidewall of the inflator until the flange seat butts against the inflator flange;

placing the concave depression of the crimping die over the distal portion of the cylindrical sleeve; and applying a suitable amount of axial force to the crimping die so that the crimping die deforms the distal portion of the sleeve radially inwardly into a clamping band underlying at least a portion of the inflator flange to clamp the inflator flange between the clamping band and the flange seat and thereby secure the mounting bracket to the inflator.

12. The method of claim 11 further including providing an inflator nest having a face surrounding a generally cylindrical recess sized to receive a portion of the cylindrical sidewall of the inflator and placing the inflator with the mounting bracket positioned thereon within the cylindrical recess so that the annular support of the mounting bracket abuts the face prior to placing the concave depression of the crimping die over the distal portion of the cylindrical sleeve.

13. The method of claim 12 wherein the amount of axial force applied to the crimping die is sufficient to clamp the inflator flange between the flange seat and clamping band to prevent inflator rotation with respect to the mounting bracket in addition to securing the mounting bracket to the inflator.

14. The method of claim 13 wherein the clamping band is continuous.

15. The method of claim 14 wherein the annular support is continuous.

16. The method of claim 15 wherein the flange seat is continuous.

\* \* \* \* \*